Patented Dec. 31, 1940

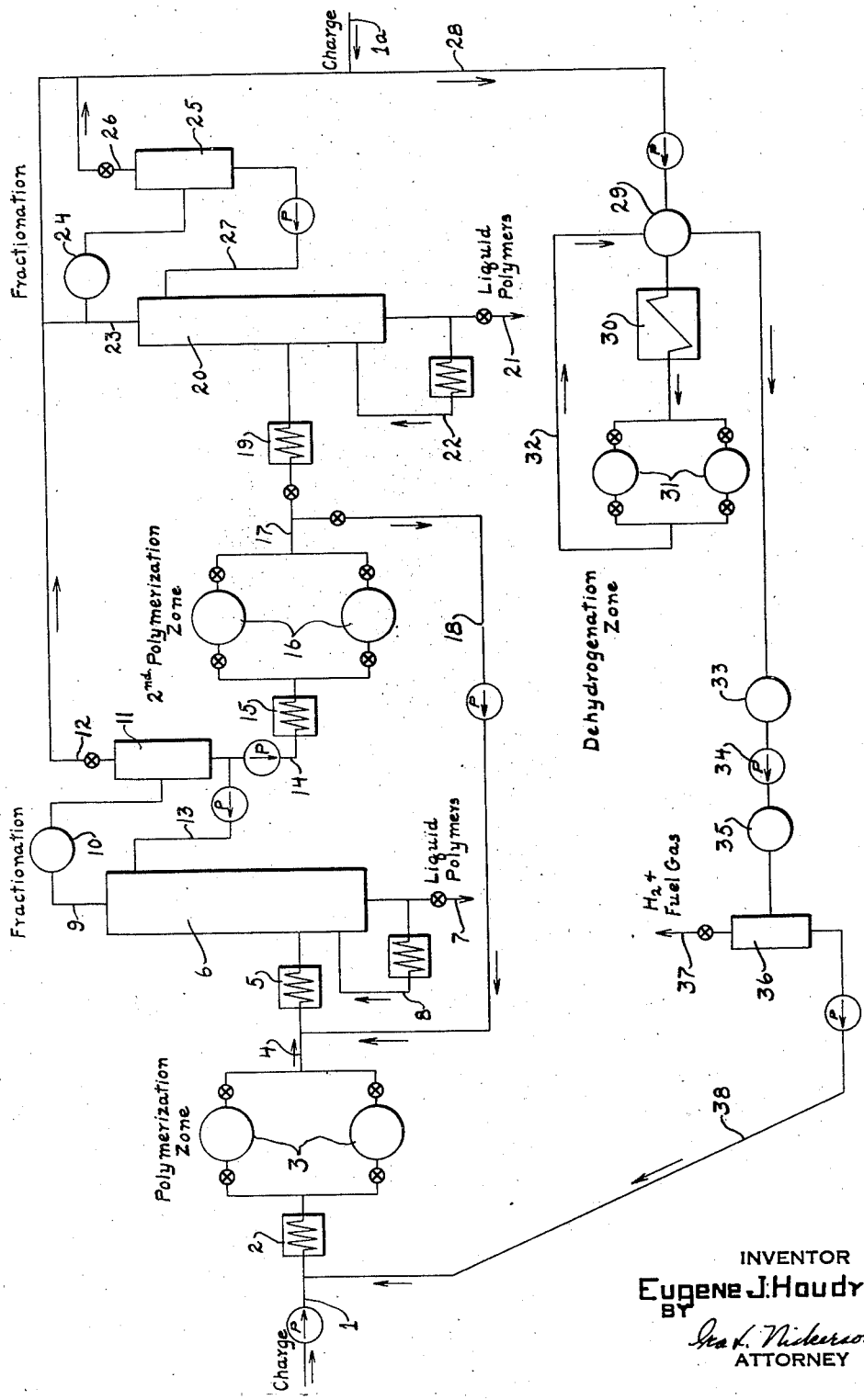

2,226,562

UNITED STATES PATENT OFFICE 2,226,562

PRODUCTION OF LIQUID POLYMERS

Eugene J. Houdry, Haverford, Pa., assignor to Houdry Process Corporation, Wilmington, Del., a corporation of Delaware Application November 23, 1936, Serial No. 112,381

6 Claims. (Cl. 196—10)

This invention relates to the formation and recovery of liquid polymers from hydrocarbon gases and includes both the polymerization of unsaturates or olefins in a gaseous charge and also the cracking or dehydrogenation of gases to produce unsaturates capable of polymerization.

One object of the invention is to produce a maximum yield of liquid products from hydrocarbon gases. Another object is to act upon a given charge of hydrocarbon gases so as to convert and extract therefrom as liquid a major portion of unsaturates contained therein. Another object is to effect dehydrogenation of gaseous material to convert at least a part of the same into unsaturates capable of polymerization. Another object is to devise an improved circuit comprising both polymerization and dehydrogenation zones for effecting the above objects. Still other objects will be apparent from the detailed description which follows.

In order to illustrate the invention and the manner of its operation a preferred embodiment thereof is illustrated in the accompanying drawing which shows diagrammatically a circuit involving polymerization and dehydrogenation and indicates the requisite pieces of apparatus.

Referring to the drawing, a charge of hydrocarbon gases containing substantial amounts of unsaturates is fed by line 1 from any source through heater 2 and is then sent under reaction conditions into a primary polymerization zone which may comprise one converter or a battery of converters 3 (two being shown). Polymerized and unpolymerized materials leave the zone by line 4, pass through unit 5 where they are either heated or cooled, as may be necessary, for the subsequent separation of liquid polymers which takes place in fractionator 6. The liquid products are removed by line 7, a reboiling circuit 8 being utilized at the bottom of fractionator 6 if desired, while the gaseous overhead products pass by line 9 through condenser 10 into a separator 11 which may have a vent 12 for the removal of uncondensed material. A part of the liquefied material in separator 11 may be pumped back into fractionator 6 by line 13 to act as reflux. The remainder is sent by line 14 through unit 15 and under reaction conditions into a second polymerization zone which may comprise a battery of converters 16. The stream of material leaving this zone by line 17 may all be sent back by line 18 to be added to the stream of products in line 4, leaving the first polymerization zone for recirculation through fractionator 6 and the second polymerization zone, or all of it may pass through heating or cooling unit 19 into fractionator 20. By preference the stream in line 17 is divided, a portion being recirculated through line 18 while the remainder passes into fractionator 20. The liquid polymers leave the last-named element by line 21, a reboiling circuit indicated at 22 being utilized if desired, and the overhead gaseous material leaves fractionator 20 by line 23. A part of the overhead may be sent through condenser 24 into separator 25, which has a vent 26, and provides liquid refluxed material which is pumped back into the top of fractionator 20 by line 27. The remainder of this overhead, which is practically stripped of all unsaturates and which may be augmented by the gaseous material vented through lines 12 and 26, is sent by line 28 through heat exchanger 29 and heater 30 under reaction conditions into a dehydrogenation zone wherein the hydrocarbon saturates are cracked and converted at least partially into unsaturates. To line 28 additional charge comprising gaseous hydrocarbons poor in unsaturates may be added by line 1a. The dehydrogenation may be effected in one or more converters 31. The products leave the dehydrogenation zone by line 32 which conducts them back through the heat exchanger 29, thence through condenser 33 where the material is cooled, put under pressure by pump 34, sent through cooler or condenser 35 and then into a separator 36 whence hydrogen and other light gases are removed by line 37 for fuel or other uses while the liquefied material, including unsaturates, is sent through line 38 to line 1 where it is added to fresh charge entering the circuit. When the material available for charge comprises essentially saturated hydrocarbons, as in natural gas, the entrance to the circuit will be by line 1a rather than by line 1.

The polymerization of unsaturates in the two zones provided for this purpose may be effected in any known or desired manner, either thermally or catalytically, either in gaseous phase or in liquid phase, or in a combination of both phases. The ratio of recycled material to unrecycled charge going to the first fractionator 6 may range from 0.5:1 to 5:1. The usual ratio is about 1½:1. Likewise the dehydrogenation of the tail gases from the second polymerization zone and of any fresh material added by line 1a to produce unsaturates may be effected in any known manner either thermally or catalytically. Sufficient apparatus is indicated in the circuit to permit the same to use any necessary temperature, pressure and rate of feed. The polymerization effected in one of the two polymerization zones may be different from that carried out in the other, the general purpose being to produce a maximum yield of the desired type of liquid polymers.

One method of polymerization which is found to be quite suitable for both the primary and the second polymerization zones is a catalytic operation effected at low temperature (below the critical temperature of the charge) and in liquid phase in contact with catalyst which can be readily restored to activity through regenerating by oxidation either in situ or after removal from the converter. The preferred catalyst is silicious in nature and preferably a blend of silica and alumina in controlled ratio. It may be produced by chemical treatment of naturally occurring clays or synthetically as a type of gel in known manner. A good catalyst is one produced by the interaction of a soluble silicate and a soluble alum to provide a silica to alumina weight ratio of about 9:1, this material being prepared in the form of grains or molded pieces. The operation takes place within the range of 50 to 300° F., the highest yield of light or high boiling hydrocarbons in the gasoline range being made at a temperature of 180 to 225° F. The charge is sent to the zone wholly or partly in liquid phase and is maintained under sufficient pressure in the polymerization zone so that at least one constituent is always in liquid phase. The pressure used depends somewhat upon the temperature selected but may range up to 700 lbs. per sq. in. For the preferential operating range of 180 to 225° F. to produce gasoline, pressure of about 500 pounds is normally used. The feed rate to the polymerization zone may be from 5 to 75 cu. ft. of gas per hour per liter of catalyst, depending upon the amount of unsaturates in the charge. When the charge contains about 25% of unsaturates, a good rate is 25 cu. ft. of gas per hour per liter of catalyst. The feed rate would be increased as the percentage of unsaturates decreases. In general, by operating the zone at constant temperatures, the yield of polymers in the gasoline boiling range can be increased by increasing the rate of feed. On the other hand, by operating at constant feed rate the production of polymers higher boiling than gasoline can be increased by raising the temperature. This liquid phase process of polymerization is disclosed and claimed in the copending application of myself and J. P. Daugherty, Jr., Serial No. 239,632, filed November 9, 1938, as a substitute for and a continuation-in-part of Serial No. 109,680, filed November 7, 1936.

By using the particular polymerization process described above, it is possible to convert from 40 to 50% of the unsaturates in the charge into recoverable liquids in each of the polymerization zones. A good operation is to use the same reaction conditions in both zones, for example, 220° F. and 450 pounds pressure. Another operation which gives a slightly better yield is to use one set of operating conditions, as 200° F. and 400 pounds pressure, in the primary polymerization zone and higher temperature and pressure conditions in the second polymerization zone with a recirculating feed ratio in the second zone of about 2:1. Either of these operations leaves only a small relative percentage of unsaturates in the overhead material from fractionator 20 which is sent to the dehydrogenating zone.

A good operation for the dehydrogenation zone is one effected catalytically at low pressure and in vapor phase. The catalyst is preferably a blend of chromium oxide and aluminum oxide on a suitable support, such as an aluminum silicate. A preferred catalyst is formed from aluminum chromite, aluminum chromate or chromium aluminate incorporated in comminuted form in a support comprising china clay or kaolin and molded in pieces of uniform size and shape to facilitate regeneration. Alumina, in conjunction with chromium oxide, acts as a stabilizer giving optimum yields over a broader range of temperature with a minimum of undesirable side reactions. The operating temperature is in the range of 900 to 1000° F. and preferentially in the range of 925 to 975° F. The pressure is kept as low as possible, usually below 30 pounds per sq. in. The charge is sent in vapor phase at a rate of the order of 6 to 15 volumes of gas per minute per volume of catalyst, giving a contact time up to approximately 10 seconds. The longer contact time is utilized for the lower temperature in the operating range; for a temperature of 975° F. the contact time is usually 6 seconds or less. The percentage of conversion to unsaturates is usually from 17 to 21% per volume of outlet gases or from 22 to 26% by weight of saturates transformed. By preference, the catalyst is disposed in a deep bed with perforated inlet and outlet conduits symmetrically arranged and embedded in the mass to effect parallel flow of reactants and uniform operating conditions throughout the converter, after the manner disclosed in my United States Patent No. 2,042,468 issued June 2, 1936.

The hydrogen produced during the cracking operation in the dehydrogenation zone can be recirculated back through the polymerization zones since it has little if any adverse effect upon the polymerizing operation, especially when conducted in the liquid phase as set forth above. However, its volume steadily increases as the operation continues, and hence it is advisable to remove it from the system as provided by separator 36 which is interposed between the dehydrogenation zone and the point of addition to the charge in line 1 of the unsaturates produced in the last mentioned zone.

While the invention is herein disclosed in what is now considered to be a preferable form, it is to be understood that the invention is not limited to the specific details thereof but covers all changes, modifications and adaptations within the scope of the appended claims.

I claim as my invention:

1. Process of treating hydrocarbon gases to effect polymerization and the recovery of desirable liquid products comprising sending fresh charge under reaction conditions to a primary polymerization zone, removing liquid polymers from the stream leaving said zone, sending the remainder of the stream under reaction conditions to a second polymerization zone, adding at least a part of the products of said last named zone to the stream leaving the primary polymerization zone for removal of liquid polymers and for recirculation of unremoved material through said second polymerization zone, effecting a final removal of liquid polymers after said second polymerizing zone from the products of said zone which are not returned to said first polymerization zone, sending the gases remaining from said final removal of liquid polymers under reaction conditions to a dehydrogenation or gas cracking zone to convert the same at least partly into unsaturates, and adding the unsaturates so produced to the fresh charge to be again subjected to the above operations.

2. Process of treating hydrocarbon gases to effect polymerization and the recovery of desirable liquid products comprising sending fresh charge under reaction conditions to a primary polymerization zone, removing liquid polymers from the stream leaving said zone, sending the remainder of the stream under reaction conditions to a second polymerization zone, dividing the stream leaving said second polymerization zone and adding a part to the stream leaving the primary polymerization zone for further treatment in the second polymerization zone, removing liquid polymers from the remainder of the stream leaving said second polymerization zone, sending the gases from the last-removing step under reaction conditions to a dehydrogenation or gas cracking zone to convert the same at least partly into unsaturates, sending the resulting unsaturates back to said primary polymerization zone, and repeating the above steps.

3. Process of treating low boiling, normally gaseous hydrocarbons to produce higher boiling, normally liquid products comprising sending a charge of low boiling hydrocarbons containing substantial amounts of unsaturates under reaction conditions through a plurality of separate serially arranged polymerization zones, polymerization in each of said zones being effected below the critical temperature of the charge and under sufficient pressure to maintain the charge in liquid phase, recycling fluid products from one of said zones, which is subsequent to the first zone of said serially arranged plurality, back into a preceding point of the circuit to become admixed with fluid products from a preceding polymerization zone, and then passing components of the resultant mixture within approximately the boiling range of the aforesaid charge through the zone next following the last-mentioned polymerization zone, and controlling the aforesaid recycling step so that the ratio of recycled hydrocarbons to the last-mentioned fluid products in the aforesaid resultant mixture will be not more than 5 to 1.

4. Process of treating low boiling, normally gaseous hydrocarbons to produce higher boiling, normally liquid products comprising sending a charge of low boiling hydrocarbons containing substantial amounts of unsaturates under reaction conditions through a polymerization zone, sending a portion of the products from said polymerization zone, which boils approximately within the range of the aforesaid charge, under reaction conditions through a subsequent polymerization zone, withdrawing products of reaction from said subsequent polymerization zone, and recycling at least a portion of the last-mentioned products of reaction, coming within approximately the boiling range of the aforesaid charge, in admixture with the aforesaid portion of the products from the first-mentioned polymerization zone, through said subsequent polymerization zone, the ratio of recycled to unrecycled hydrocarbons introduced into said subsequent polymerization zone being within the range of from 0.5:1 up to 5:1 and polymerization in both zones being effected in liquid phase and at temperatures not exceeding substantially 300° F.

5. Process of treating low boiling, normally gaseous hydrocarbons to produce higher boiling, normally liquid products comprising sending a charge of low boiling hydrocarbons containing substantial amounts of unsaturates under reaction conditions and in liquid phase through a polymerization zone, fractionating the products leaving said polymerization zone to remove normally liquid polymers therefrom, sending at least a portion of the remainder of said products, which boil within the boiling range of the aforesaid charge, under reaction conditions and in liquid phase through a subsequent polymerization zone, and sending at least a portion of the products from said subsequent polymerization zone into admixture with products from the first-mentioned polymerization zone, prior to fractionation of the last-mentioned products, to undergo further treatment in said subsequent polymerization zone, the ratio of products recycled from said subsequent polymerization zone to products from said first-mentioned polymerization zone being within the range of 0.5:1 up to 5:1.

6. Process of treating low boiling, normally gaseous hydrocarbons to produce higher boiling, normally liquid products comprising sending a charge of low boiling hydrocarbons rich in unsaturates under predetermined reaction conditions through a polymerization zone to effect a polymerization of only a portion of said unsaturates; fractionating the products leaving said polymerization zone to remove normally liquid polymers therefrom, sending at least a portion of the remainder of said products, which boil within the boiling range of the aforesaid charge, under reaction conditions through a subsequent polymerization zone, the reaction conditions for polymerization being more drastic in said subsequent polymerization zone than in the first-mentioned polymerization zone; separating normally liquid polymers from at least a portion of the products from said subsequent polymerization zone, and sending at least a portion of the remainder of the last-mentioned products, which boil within the boiling range of the aforesaid charge, in admixture with the aforesaid portion of the products from the first-mentioned polymerization zone through said subsequent polymerizing zone and in the ratio of recycled to unrecycled products of about 2:1, polymerization being effected in both said zones in liquid phase by the action of catalysts comprising silica and alumina in controlled ratio.

EUGENE J. HOUDRY.